(12) United States Patent
Yang et al.

(10) Patent No.: US 6,420,655 B1
(45) Date of Patent: Jul. 16, 2002

(54) STRUCTURE OF BUS BAR ASSEMBLY FOR POWER SUPPLY

(75) Inventors: Ta-Jung Yang; Hsi-An Liu, both of Taoyuan Hsien (TW)

(73) Assignee: Delta Electronics, Inc., Taiwan (CN)

( * ) Notice: Subject to any disclaimer, the term of this patent is extended or adjusted under 35 U.S.C. 154(b) by 0 days.

(21) Appl. No.: 09/711,552

(22) Filed: Nov. 13, 2000

(51) Int. Cl.⁷ .................................................. H02G 5/00
(52) U.S. Cl. .................................... 174/70 B; 174/99 B
(58) Field of Search ........................... 174/70 B, 71 B, 174/72 B, 99 B, 133 B, 149 B; 361/660

(56) References Cited

U.S. PATENT DOCUMENTS

| | | | |
|---|---|---|---|
| 2,439,956 A | * 4/1948 | Wagner et al. | 174/99 B |
| 2,453,314 A | * 11/1948 | Hammerly | 174/149 B |
| 2,725,541 A | * 11/1955 | Born et al. | 174/71 B |
| 3,210,716 A | * 10/1965 | Meacham | 174/71 B |
| 3,732,523 A | * 5/1973 | Fouse et al. | 174/71 B |
| 3,884,541 A | * 5/1975 | O'Nan et al. | 174/72 B |
| 4,002,388 A | * 1/1977 | Menocal | 174/72 B |
| 4,025,826 A | * 5/1977 | Wilson et al. | 174/133 B |
| 4,041,358 A | * 8/1977 | Donahue et al. | 174/70 B |
| 4,419,715 A | * 12/1983 | Pear | 174/133 B |
| 5,717,161 A | * 2/1998 | Wakata | 174/72 B |
| 5,847,321 A | * 12/1998 | Carle et al. | 174/99 B |
| 5,866,848 A | * 2/1999 | Asselta et al. | 174/72 B |
| 5,872,711 A | * 2/1999 | Janko | 174/72 B |
| 5,944,555 A | * 8/1999 | Robinson et al. | 439/517 |
| 5,982,611 A | * 11/1999 | Campbell et al. | 361/664 |
| 6,191,948 B1 | * 2/2001 | Beyer | 361/729 |

* cited by examiner

Primary Examiner—Dean A. Reichard
Assistant Examiner—Adolfo Nino
(74) Attorney, Agent, or Firm—Gottlieb, Rackman & Reisman, P.C.

(57) ABSTRACT

A structure of a bus bar assembly for a power supply module is provided. The structure includes a bus bar main body having a first plate and a second plate wherein the first plate is at a specific angle with the second plate, and a plurality of bus bar joints connected to the first plate wherein each of the bus bar joints includes two clipper sheets for providing a clipping force. Such structure has the advantages of more flexibility, less consuming time, less space occupied and better electrical conductivity.

17 Claims, 10 Drawing Sheets

STRUCTURE OF BUS BAR ASSEMBLY FOR POWER SUPPLY

FIELD OF THE INVENTION

The present invention relates to a structure of a bus bar assembly for a power supply, and more particularly, to a structure of a bus bar assembly for a telecom power supply.

BACKGROUND OF THE INVENTION

A customarily used power supply includes a converter for converting an AC or a DC input voltage to a DC output voltage and a switching model rectifier which has been widely used in telecommunication applications to provide a regulated 24 volt or 48 volt power source for communication switching systems.

The power supply generally employs a plurality of separated power supply modules, which facilitates increasing the capacity and reliability of the power supply. When one of the power supply modules fails, it can be replaced and repaired immediately and the others could continuously provide power to the loads. Commonly, some of the power supply modules provide power to the loads, and the others act as redundant power supply modules.

It is a good way to provide a power having low DC voltage and high current such that the energy efficiency and the quality of telecommunication are increased. Referring to FIG. 1, a typical power system for a base station includes a system frame 1, also referred as a bay, and a circuit portion 2. The system frame 1 is usually divided into several shelves 11, wherein a plurality of power supply modules 12 are disposed in each shelf. The circuit portion 2 principally includes breakers, fuse and control circuits (not shown) for providing the regulated or converted current to a load. The plurality of power supply modules 12 in each shelf 11 are coupled to a device, i.e. so-called bus bar, in parallel. A customarily used bus bar, as can be seen in FIGS. 2 and 3, principally comprises a main body 3, an L-type conductive sheet 31 and a bus bar joint 32. One end of the L-type conductive sheet 31 is connected to the main body 3 by using a plurality of screws 312 coupled with corresponding holes 311. The other end of the L-type conductive sheet 31 is connected with the bus bar joint 32 by locking a fastening element 321. The bus bar joint 32 comprises two clipper sheets 322 and 322' having bending ends, a base 323 for inserting one end of each piece of clipper sheets, and a fastening element 321 for fastening these two clipper sheets on the L-type conductive sheet 31. A resultant clipping force is provided owing to the structure of the bus bar joint 32. The clipping force facilitates the connection between the output terminal 121 of the power supply module 12 and the clipper sheets of the bus bar assembly.

In practice, the above-mentioned structure of bus bar has many disadvantages as follows:

(1) The main body 3 of the bus bar is readily deformed when the power supply module 12 is sent to the system frame 1 because the shape thereof is a thin metal plate having a long length and a short width and it is disposed vertically. Please refer to FIG. 4. A normal force, F1, is acted on the main body 3 of the bus bar upon connecting the output terminal 121 of the supply module 12 with the corresponding bus bar joint 32. The repeated actions of pushing (see the direction of the arrow showing in FIGS. 2 and 3) and pulling the power supply module 12 into/out the system frame will cause a deformation of the main body 3 for a long period.

(2) The size of the power supply module 12 is too large because the length of the L-type conductive sheet 31 needs to be large enough for connecting well with the main body 3 of the bus bar. Therefore, the numbers of the power supply modules 12 occupied in each shelf 11 is limited. In order to fully utilize the space of the shelf 11, the size of the power supply module 12 is designed as large as possible, which usually places restrictions on the variety and flexibility of the power supply modules. Generally, the use of the power supply module can be flexible if the size thereof is appropriately reduced.

(3) The space within the shelf 11 is not fully utilized because much space is occupied by the bus bar joint 3 extending inward the shelf 11.

(4) The construction of the bus bar assembly is not easy because the steps thereof include connecting the bus bar joint 32 with the L-type conductive sheet 31 and connecting the L-type conductive sheet with the main body 3. Apparently, these constructing steps are time consuming.

(5) The electrical conductivity is not good because the thickness of the L-type conductive sheet 31, the contact regions and the fastening element will increase the overall impedance of the bus bar assembly.

Therefore, the present invention provides an improved structure of a bus bar assembly for overcoming the problems described above.

SUMMARY OF THE INVENTION

It is the first object of the present invention to provide a structure of a bus bar assembly for a power supply module having the advantages of more flexibility, less consuming time, less space occupied and better electrical conductivity.

According to the present invention, the structure of the bus bar assembly for a power supply module includes a bus bar main body having a first plate and a second plate wherein the first plate is at a specific angle with the second plate, and a plurality of bus bar joints connected to the first plate wherein each of the bus bar joints includes two clipper sheets for providing a clipping force.

In accordance with one aspect of the present invention, the first plate, the second plate and the two clipper sheets are made of the materials having high conductivity, high melting point and low expansive ratio.

Preferably, such material is copper.

In accordance with another aspect of the present invention, the specific angle is in a range from 30 to 180 degree, preferably, in a range from 45 to 135 degree, and more preferably in a range from 60 to 120 degree.

In accordance with another aspect of the present invention, the two clipper sheets are connected to the first plate by using a fastening element.

Preferably, the fastening element is one selected from a group consisting of a bolt, a screw and an engagement.

Preferably, the fastening element comprises a spring for providing a further clipping force.

In accordance with another aspect of the present invention, the both sides of each clipper sheet are fixed on the first plate by using a plurality of fixing elements.

Preferably, the fixing element is one selected from a group consisting of pins, bolts and screws.

In accordance with another aspect of the present invention, the two clipper sheets can be integrally formed with the first plate.

It is the second object of the present invention is to provide a further structure of a bus bar assembly for a power supply module. According to the present invention, the structure of the bus bar includes a bus bar main body having a first plate and a second plate wherein the first plate is perpendicular to the second plate, and a plurality of bus bar joints connected to the first plate wherein each of the bus bar joints includes two clipper sheets for providing a clipping force.

Preferably, the second plate and the clipper sheets are made of copper.

Preferably, the two clipper sheets are connected to the first plate by using a fastening element. The fastening element is one selected from a group consisting of a bolt, a screw and an engagement.

Certainly, the fastening element includes a spring for providing a further clipping force.

Preferably, both sides of each clipper sheet are fixed on said first plate by using a plurality of fixing elements.

Preferably, the fixing element is one selected from a group consisting of a pin, a bolt and a screw.

Certainly, the two clipper sheets can be integrally formed with the first plate.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 5:
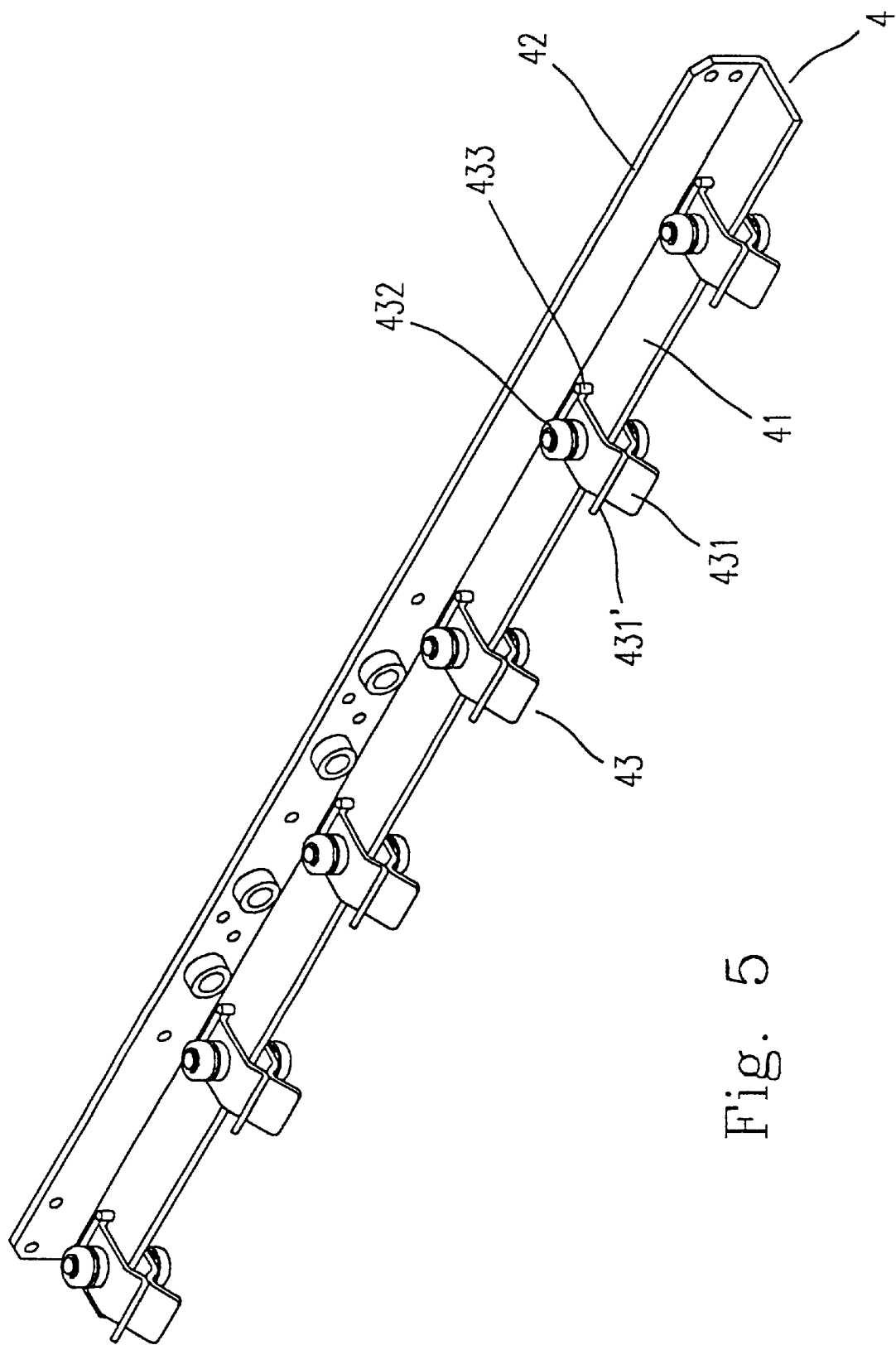
FIG. 5 is a perspective sectional view of a bus bar assembly according to the first preferred embodiment of the present invention.
Figure 6:
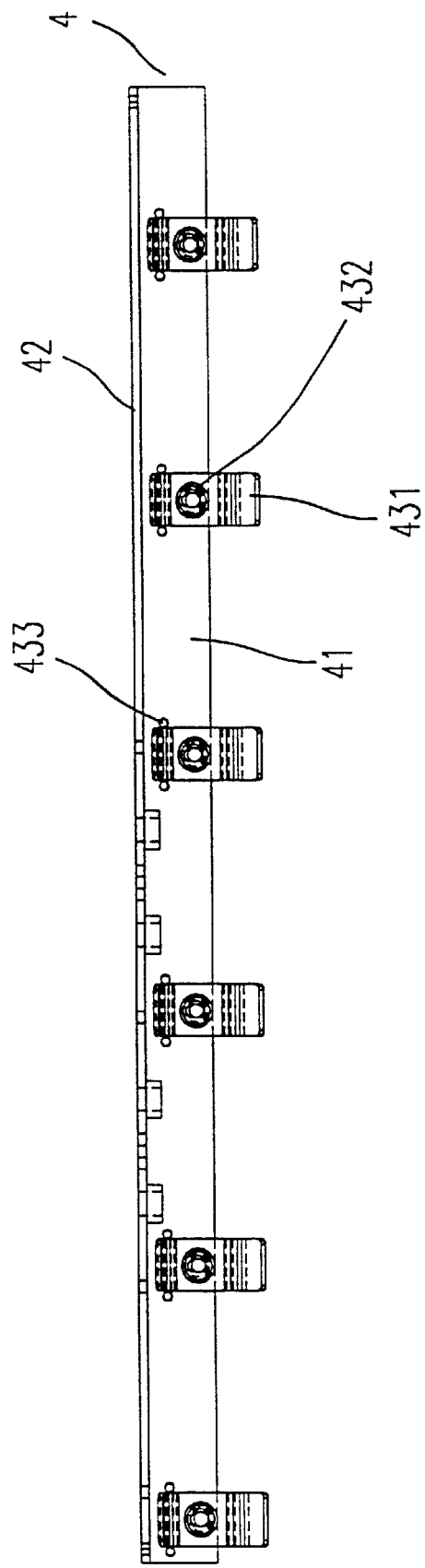
FIG. 6 is a top sectional view of a bus bar assembly in FIG. 5.
Figure 7:
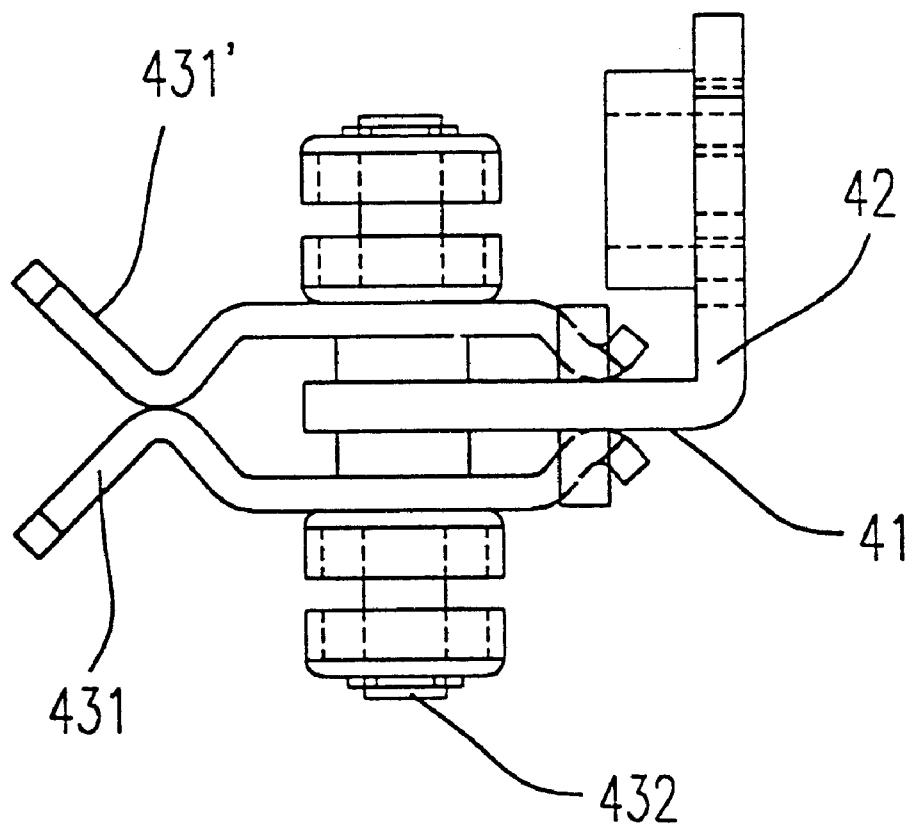
FIG. 7 is a side sectional view of a bus bar assembly in FIG. 5.

Referring to FIGS. 5, 6 and 7, the first preferred embodiment of the present invention includes a bus bar main body 4 which is composed of a first plate 41 and a second plate 42. These two plates are made of copper. The first plate 41 is at an angle with the second plate 42. In this embodiment, the angle is 90 degree such that the bus bar main body is in a shape of "|". The first plate 41 is placed horizontally; however, the second plate 42 is placed vertically. The bus bar joint 43 includes two clipper sheets 431, 431', a fastening element 432 and two fixing elements 433 locking on the first plate 41 and the both sides of the two clipper sheets 431, 431'. These two clipper sheets 431, 431' are also made of copper. The fastening element 432 is used for fixing these two clipper sheets on the first plate 41. And the two fixing elements 433 are used for preventing the two clipper sheets 431, 431' from moving. Certainly, the fastening element 432 can be one selected from a groups consisting of a bolt, a screw and an engagement. In order to provide the two clipper sheets 431, 431' with increasing clipping force, the fastening element 432 can further include a spring (not shown). Furthermore, the fixing element 433 is one selected from a group consisting of pins, bolts and screws.

Apparently, the length of bus bar joint 43 according to the present invention protruding out the bus bar main body 4 is somewhat reduced such that most space of the system frame can be adequately utilized when the bus bar assembly is connected with the power supply module.

Figure 1:
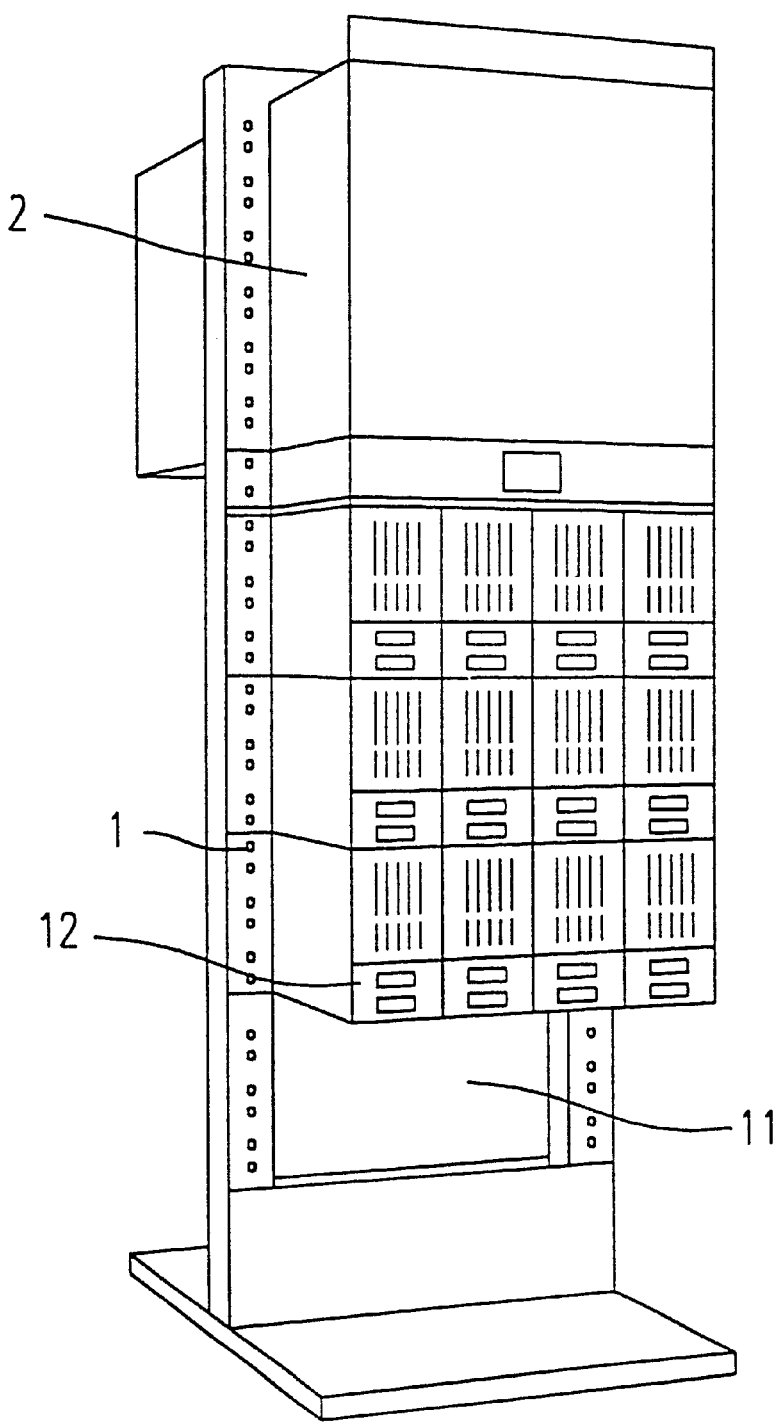
FIG. 1 is a schematic view of a power system according to prior art.

Furthermore, the L-type conductive sheet 31 in this embodiment is omitted such that the first plate 41 can be equipped with more bus bar joints 43. For example, in the system frame 1 shown in FIG. 1 each shelf 11 contains at most four power supply modules 12, i.e., the bus bar can contain at most four bus bar joints 32. In place of the bus bar according to the prior art, every shelf 11 in the system frame 1 can contain six power supply modules by using the bus bay assembly of the present invention. Although the capacity may reduce compared with the prior art, increasing the number and reducing size of the power supply module facilitate producing the power supply with variety and reliability.

Figure 8:
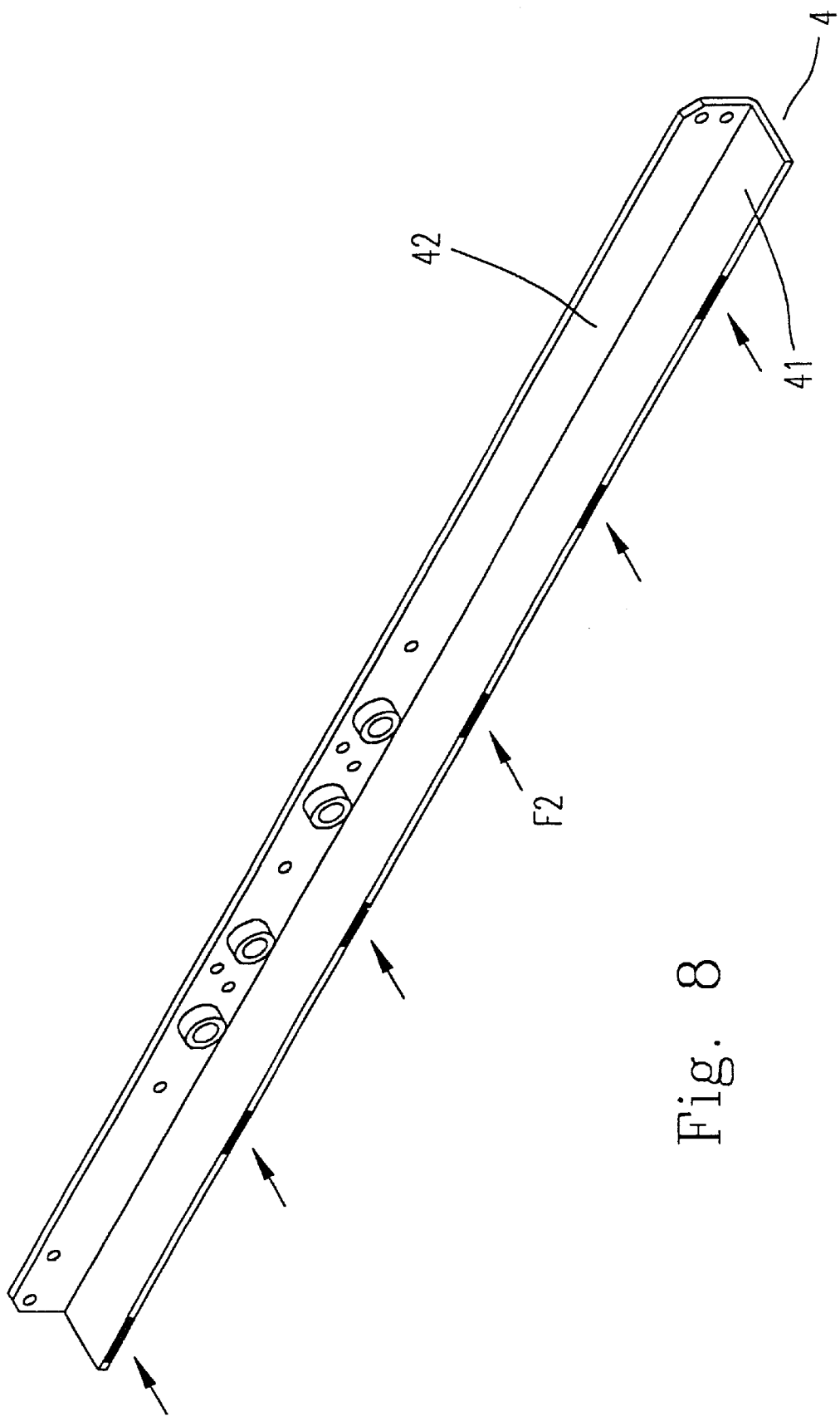
FIG. 8 is a schematic view of a bus bar assembly in FIG. 5 illustrating the force acting on the second plate.

Referring to FIG. 8, the normal force, F2, acts on the first plate 41 of the bus bar main body 4 upon connecting the output terminal 121 of the supply module 12 with the corresponding bus bar joint 43. The repeated actions of pushing and pulling the power supply module 12 into/out the system frame don't affect the bus bar main body 4 seriously even for a long period, because the first plate 41 is disposed horizontally and the width thereof is much thicker than the thickness of main body 3 according to prior art.

Figure 2:
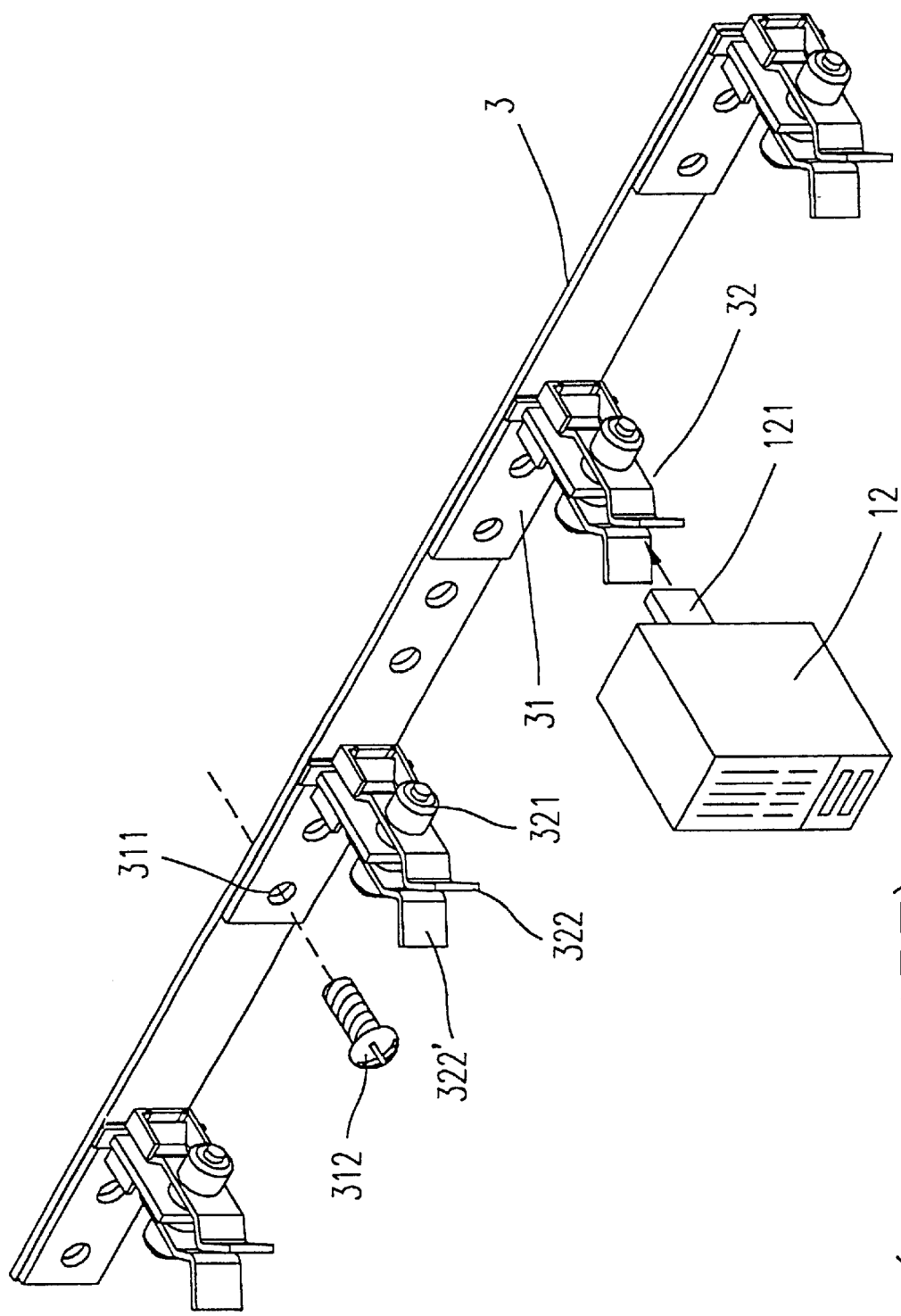
FIG. 2 is a perspective view of a bus bar assembly according to prior art.
Figure 3:
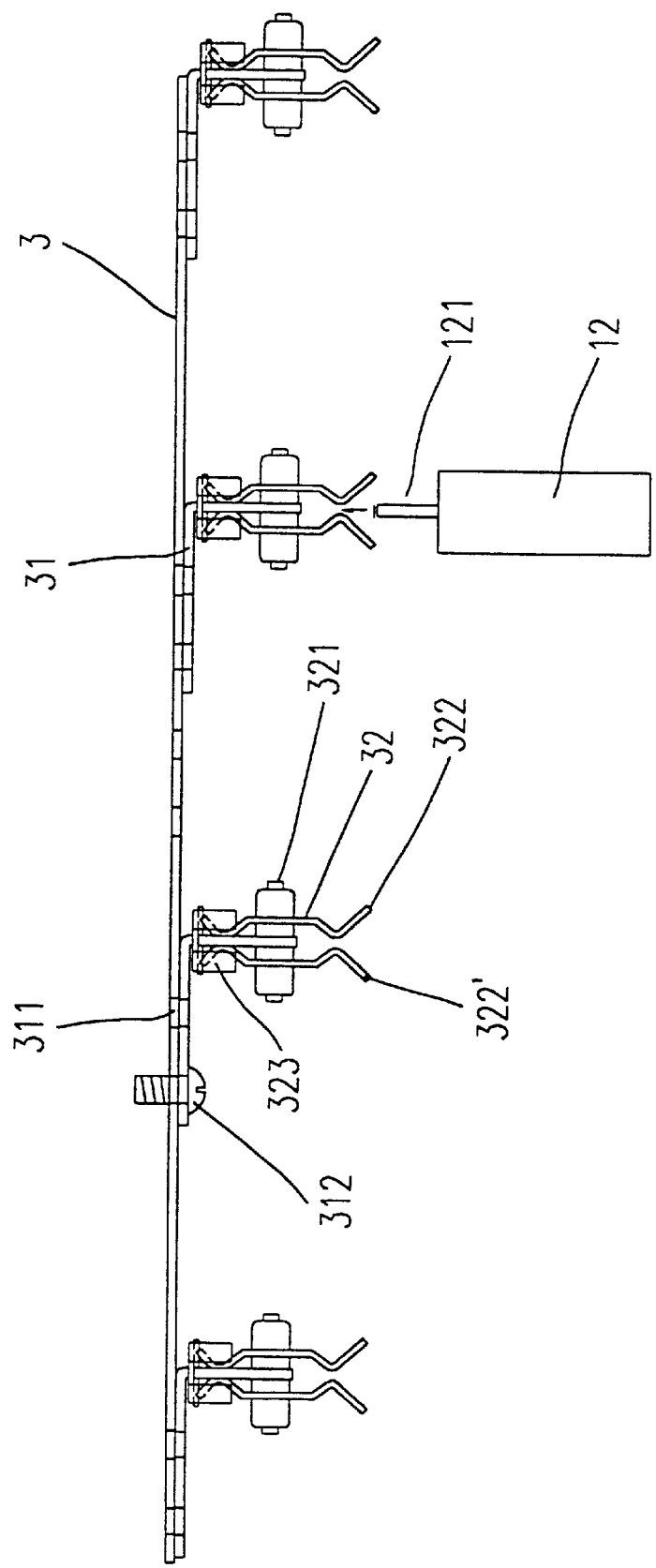
FIG. 3 is a top sectional view of a bus bar assembly in FIG. 2.
Figure 4:
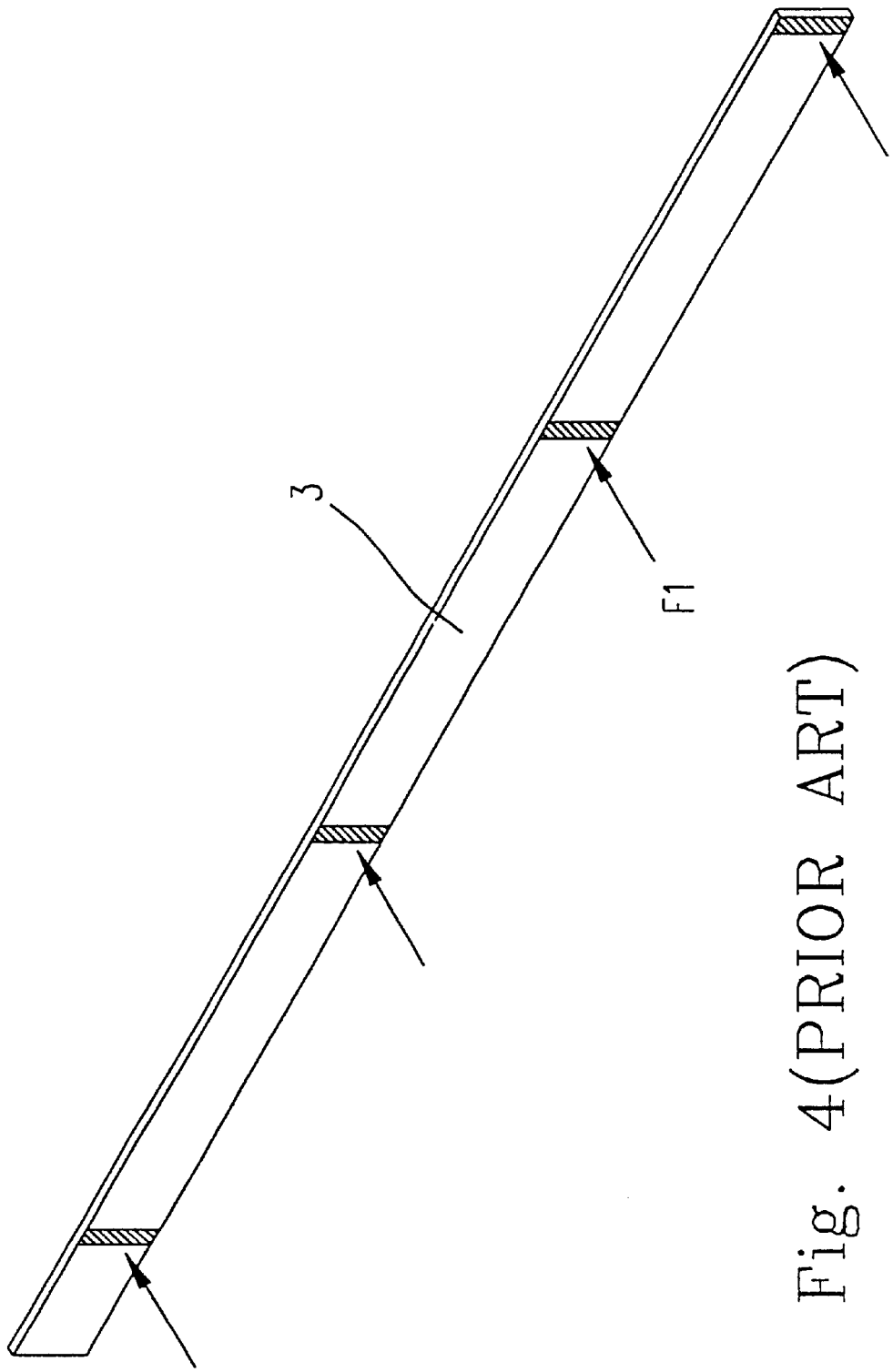
FIG. 4 is a schematic view of a bus bar assembly in FIG. 2 illustrating the force acting on the main body.

In this preferred embodiment of the present invention, assembling such bus bay assembly requires at least six elements including a bus bar main body 4, two clipper sheets 431, 431', a fastening element 432 and two fixing elements 433. However, the customarily used bus bay assembly shown in. FIG. 2 requires at least eight elements to be assembled, i.e. a main body 3, a L-type conductive sheet 31, two screws 312, a fastening element 321, two clipper sheets 322, 322' and a base 323. Moreover, assembling the bus bay assembly according to the present invention is much simpler than that in the prior art. The number of elements according to the present invention is less such that it is less cost.

Certainly, the second plate 42 can extend upward, thereby increasing the conductive area and current capacity.

Furthermore, the L-type conductive sheet 31 in the prior art is omitted such that the impedance can be reduced for increasing the conductivity.

Figure 9:
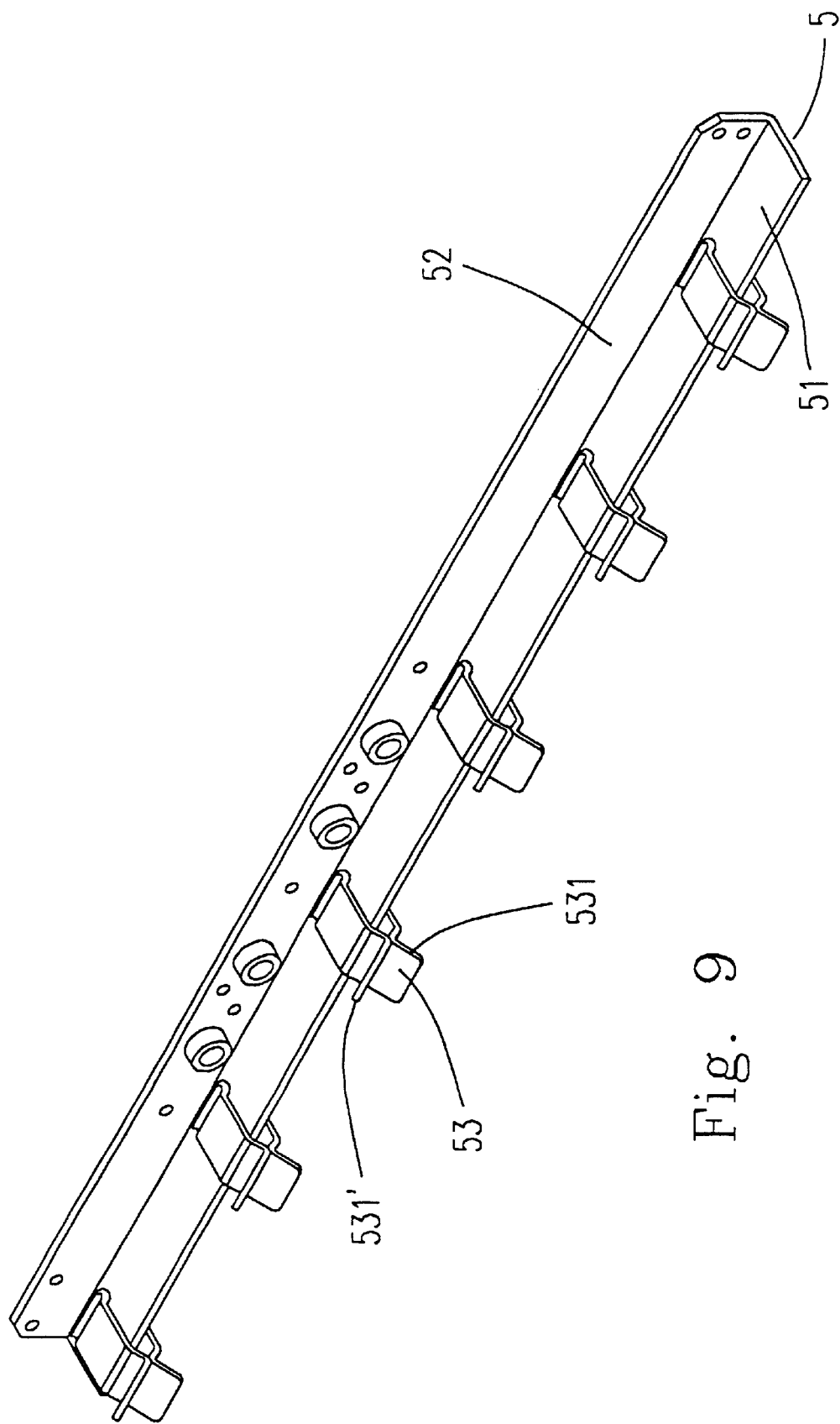
FIG. 9 is a perspective sectional view of a bus bar assembly according to the second preferred embodiment of the present invention.

FIG. 9 shows the bus bar assembly according to the second preferred embodiment of the present invention. The bus bar assembly in FIG. 9 is the same as that shown in FIG. 5 except that the two clipper sheets 531, 531' which compose the bus bar joint 53 are integrally formed with the first plate 51 and the fastening element 432 and the fixing element 433 illustrated in the first embodiment can be omitted. According to the second preferred embodiment of the present invention, the bus bar joint 53 is integrally formed with the first plate 51 such that its assembling is much easier and the cost is much reduced.

Figure 10:
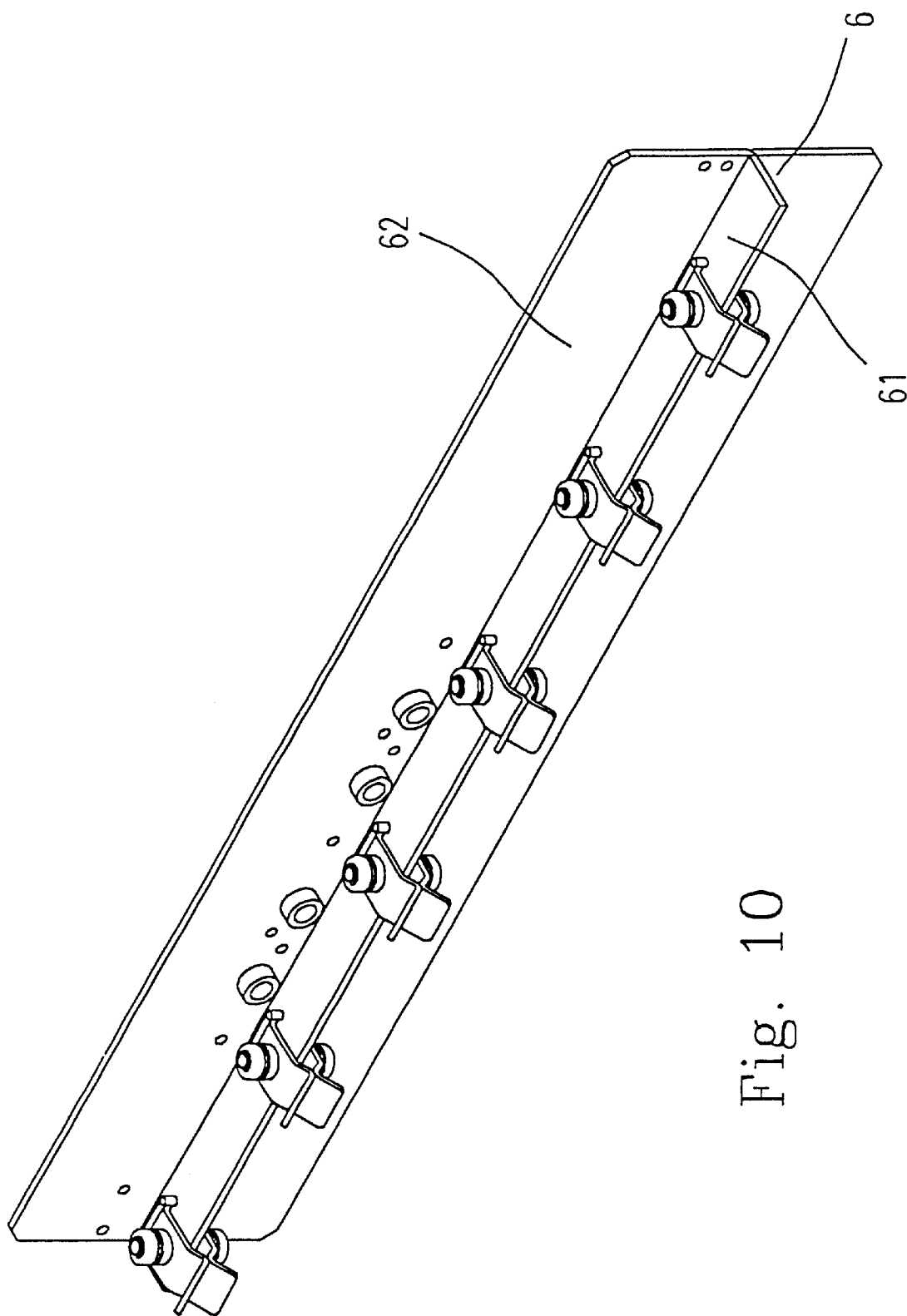
FIG. 10 is a perspective sectional view of a bus bar assembly according to the third preferred embodiment of the present invention.

FIG. 10 shows the bus bar assembly according to the third preferred embodiment of the present invention. The bus bar assembly in FIG. 10 is the same as that shown in FIG. 5 except for the second plate 62. The first plate 61 is perpendicular to the second plate 62, thereby forming the bus bar main body in a shape of "T". Certainly, the second plate 62 can extend upward and downward, thereby increasing the conductive area and current capacity.

As will be apparent from the above description according to the present invention, the structure of the bus bar assembly for a power supply module has the advantages of more flexibility, less consuming time, less space occupied and better electrical conductivity.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structure.

What is claimed is:

1. A structure of a bus bar assembly for a power supply comprising:

a bus bar main body having a first plate and a second plate wherein said first plate is at a specific angle with said second plate; and a plurality of bus bar joints connected to said first plate wherein each of said bus bar joints is two clipper sheets for providing a clipping force.

2. The structure according to claim 1, wherein said first plate, said second plate and said clipper sheets are made of copper.

3. The structure according to claim 1, wherein said specific angle is in a range from 30 to 180 degree.

4. The structure according to claim 3, wherein said angle is in a range from 45 to 135 degree.

5. The structure according to claim 4, wherein said two clipper sheets are integrally formed with said first plate.

6. The structure according to claim 3, wherein said angle is in a range from 60 to 120 degree.

7. The structure according to claim 1, wherein said two clipper sheets are connected to said first plate by using a fastening element.

8. The structure according to claim 7, wherein said fastening element is one selected from a group consisting of a bolt, a screw and an engagement.

9. The structure according to claim 1, wherein each of said two clipper sheets is respectively fixed on said first plate by using a plurality of fixing elements to prevent said two clipper sheets from moving.

10. The structure according to claim 9, wherein said fixing element is one selected from a group consisting of a pin, a bolt and a screw.

11. A structure of a bus bar assembly for a power supply comprising:

a bus bar main body having a first plate and a second plate wherein said first plate is perpendicular to said second plate; and a plurality of bus bar joints connected to said first plate wherein each of said bus bar joints is two clipper sheets for providing a clipping force.

12. The structure according to claim 11, wherein said first plate, said second plate and said clipper sheets are made of copper.

13. The structure according to claim 12, wherein said two clipper sheets are integrally formed with said first plate.

14. The structure according to claim 11, wherein said two clipper sheets are connected to said first plate by using a fastening element.

15. The structure according to claim 14, wherein said fastening element is one selected from a group consisting of a bolt, a screw and an engagement.

16. The structure according to claim 11, wherein each of said two clipper sheets is respectively fixed on said first plate by using a plurality of fixing elements to prevent said two clipper sheets from moving.

17. The structure according to claim 16, wherein said fixing element is one selected from a group consisting of a pin, a bolt and a screw.

* * * * *